United States Patent [19]

Yamaguchi et al.

[11] Patent Number: 5,050,454
[45] Date of Patent: Sep. 24, 1991

[54] ENGINE/AUTOMATIC TRANSMISSION UNIFIED CONTROL DEVICE

[75] Inventors: Hiroshi Yamaguchi, Yokohama; Yuji Kato, Tokyo; Tatsuo Wakahara, Kawasaki; Shigeki Shimanaka, Hadano; Hiroshi Asano, Zama; Shinsuke Nakazawa, Yokohama, all of Japan

[73] Assignee: Nissan Motor Company, Ltd., Yokohama, Japan

[21] Appl. No.: 656,317

[22] Filed: Feb. 19, 1991

[30] Foreign Application Priority Data

Feb. 20, 1990 [JP] Japan ................................. 2-37160
Mar. 28, 1990 [JP] Japan ................................. 2-76691

[51] Int. Cl.⁵ ............................................. F16H 61/06
[52] U.S. Cl. ........................................ 74/858; 74/859
[58] Field of Search .................... 74/857, 858, 859

[56] References Cited

U.S. PATENT DOCUMENTS

| | | | |
|---|---|---|---|
| 4,628,774 | 12/1986 | Iwanaga | 74/867 |
| 4,724,723 | 2/1988 | Lockhart et al. | 74/857 X |
| 4,748,870 | 6/1988 | Sugino et al. | 74/866 |
| 4,889,014 | 12/1989 | Iwata | 74/859 X |
| 4,899,624 | 2/1990 | Bota et al. | 74/868 |
| 4,942,785 | 7/1990 | Jurgens | 74/861 X |
| 4,966,050 | 10/1990 | Schulz et al. | 74/867 |
| 4,982,622 | 1/1991 | Yamamoto et al. | 74/866 |

Primary Examiner—Dirk Wright
Attorney, Agent, or Firm—Pennie & Edmonds

[57] ABSTRACT

A unified control device for engine and automatic transmission of an automotive vehicles serves to alleviate a racing select shock which occurs upon engagement of a driving clutch in the transmission when selecting a running range of the transmission to start the vehicle with an accelerator pedal depressed. The control device achieves a reduction control during changeover of the transmission into a running range from a racing state, to reduce at least one parameter representing the output power to be transmitted from the engine to driving wheels via the transmission, such as engine speed, engine output and/or transfer torque capacity of the clutch, etc. The reduction control is stopped as soon as the completion of engagement of the driving clutch has been detected, to allow the vehicle to be started without engine stalling.

8 Claims, 8 Drawing Sheets

FIG_3

FIG_4

FIG_5

FIG_6

FIG_8

ENGINE/AUTOMATIC TRANSMISSION UNIFIED CONTROL DEVICE

BACKGROUND OF THE INVENTION

1. Field of the Invention

The present invention relates to a device for controlling engine and automatic transmission of an automotive vehicle in a unified manner. More particularly, it pertains to a control device for effectively reducing the so-called "racing select shock" which occurs upon starting the vehicle in a racing state.

2. Description of the Related Art

An automatic transmission for an automotive vehicle incorporates a plurality of frictional elements including a driving clutch which is maintained disengaged in a stationary state of the vehicle (i.e. N- or P-range of the transmission) and operated into engagement upon starting the vehicle. Thus, a select operation performed from a stationary state of the vehicle into a forward or reverse running range (D- or R-range) to start the vehicle is generally accompanied by a shock which occurs along with the completion of engagement of the driving clutch. Particularly in the case of a racing selection, i.e. when a running range has been selected in a racing state in which an accelerator pedal is stepped on in the N- or P-range of the transmission, there occurs a substantial shock (racing select shock) which makes driver and/or passengers feel uncomfortable. Furthermore, when a racing selection is performed at a high engine speed, a large peak torque is generated and adversely affects various transmission components, such as propeller shaft, differential gear assembly, driving shafts, etc.

A method of alleviating racing select shock is disclosed in Japanese Patent Application Laid-open Publication No. 60-4,433, which is to perform a reduction control of a parameter representing an output power to be transmitted from an engine to driving wheels of the vehicle via an automatic transmission. More particularly, the known method is to reduce the engine output upon a racing selection, by reducing the engine speed until completion of engagement of the driving clutch, for minimizing the energy to be absorbed by the clutch. While the known method serves to more or less alleviate racing select shock, a continued reduction control after completion of engagement of the driving clutch often results in an insufficient driving torque and difficulties in starting the vehicle without engine stalling.

Moreover, the known method suffers from a problem upon racing selection during a cold start of the vehicle, in that the timing when the driving clutch is actually engaged accompanies a certain time lag due to the increased viscosity of automatic transmission fluid (ATF) and a resultant delay in the hydraulic response characteristic. At the ambient temperature of $-30°$ C., for example, it takes two to five seconds after selection of a running range until actual completion of engagement of the driving clutch. Thus, during the reduction control of the engine output, the control may become excessive and would be disadvantageous in that an excessive reduction in the engine speed often result in an undesirable tendency of engine stalling, making it practically impossible to start the vehicle.

SUMMARY OF THE INVENTION

It is therefore an object of the present invention to provide an improved device for controlling engine and automatic transmission of an automotive vehicle in a unified manner, which serves to reduce racing select shock upon starting a vehicle, without the undesirable tendency of engine stalling.

Briefly stated, the present invention provides an improved engine/automatic transmission unified control device for an automotive vehicle including an engine and driving wheels driven by the engine through an automatic transmission with a driving clutch which is maintained disengaged in a neutral or parking range of the transmission and operated into engagement upon selection of a running range of the transmission.

The control device according to the present invention comprises reduction control means which is operative during a changeover of the transmission into the running range from a racing state wherein an accelerator pedal is stepped on with the neutral or parking range of the transmission selected. The reduction control means is adapted to carry out a reduction control of at least one parameter which represents an output power to be transmitted from the engine to the driving wheels of the vehicle via the transmission.

The control device according to the present invention further comprises detecting means associated with the driving clutch for detecting completion of engagement of the clutch upon completion of the changeover of the transmission into the running range, as well as reduction control stopping means which, in turn, is associated with the reduction control means and the detecting means, for stopping the reduction control of the parameter in question as soon as the detecting means detects completion of engagement of the driving clutch.

With the above-mentioned arrangement of the control device according to the present invention, when a running range is selected in a racing state of the engine, the device begins to control a reduction of at least one parameter which represents an output power to be transmitted from the engine to the driving wheels of the vehicle.

The reduction control is carried out until completion of a desired changeover of the transmission into the running range, i.e. completion of engagement of the driving clutch, which is detected by the detecting means associated with the driving clutch. In the meantime, the control device monitors and determines the necessity and extent of the reduction control all the time. Thus, during the operation of the driving clutch into engagement to actually complete the changeover of the transmission into the running range, the energy to be absorbed by the driving clutch is maintained at a substantially constant and sufficiently low level to achieve an intended alleviation of a racing select shock.

Furthermore, immediately after the completion of engagement of the driving clutch has been detected by the detecting means, the reduction control stopping means associated with the reduction control means and the detecting means serves to stop the reduction control of the parameter in question. Thus, immediately after the achievement of the intended alleviation of a racing select shock due to the reduction control, the vehicle is permitted to start normally without being accompanied by undesirable racing select shock and engine stalling.

According to one preferred embodiment of the present invention, the reduction control is effected with respect to the engine speed as the parameter which represents an output power to be transmitted from the engine to the driving wheels of the vehicle via the transmission, and the reduction control means is associated with the engine to control the engine speed according to a predetermined engine stalling speed and in a duration from the racing state until completion of engagement of the driving clutch upon changeover of the transmission into the running range.

The detecting means may be adapted to detect completion of engagement of the driving clutch by detecting decrease in the actual engine speed below a predetermined value which depends upon the engine stalling speed.

The engine stalling speed may be determined in accordance with the vehicle speed or with the output characteristics of the engine and the torque converter of the transmission.

The reduction control may be effected with respect to the engine output as the parameter representing the output power to be transmitted from the engine to the driving wheels of the vehicle via the transmission, by controlling the operation of the engine by the reduction control means. Alternatively or additionally, the parameter in question may be a transfer torque capacity of the driving clutch, with the reduction control means being adapted to control the working pressure of the driving clutch.

DETAILED EXPLANATION OF THE PREFERRED EMBODIMENTS

The present invention will now be explained with reference to some preferred embodiments shown in the attached drawings.

Figure 1:
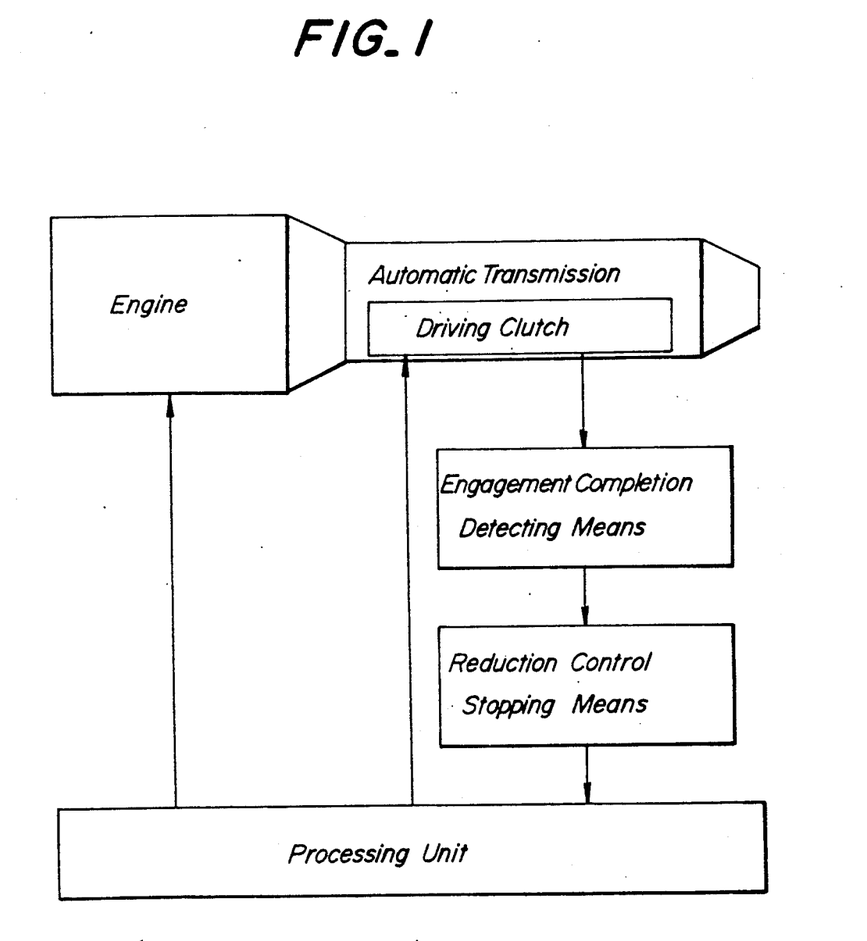
FIG. 1 is a schematic diagram showing the basic concept of the present invention.

There is schematically shown in FIG. 1 the basic concept of the present invention which provides a unified control device for controlling engine and automatic transmission of an automotive vehicle in order to reduce a racing select shock. The transmission incorporates a plurality of frictional elements including a driving clutch which is maintained disengaged in a stationary state of the vehicle and operated into engagement upon starting the vehicle.

As shown in FIG. 1, the control device according to the present invention includes reduction control means in the form of a processing unit which is operative during a changeover of the transmission into a forward or reverse running range (D- or R-range) from a racing state, for carrying out a reduction control of a parameter representing an output power which is transmitted from the engine to the driving wheels of the vehicle via the transmission, e.g. engine speed, engine output and/or transfer torque capacity of the driving clutch. The control device further includes detecting means for detecting completion of engagement of the clutch upon completion of the changeover of the transmission into the running range, and reduction control stopping means for stopping the reduction control of the parameter in question as soon as the detecting means detects completion of engagement of the driving clutch.

Figure 2:
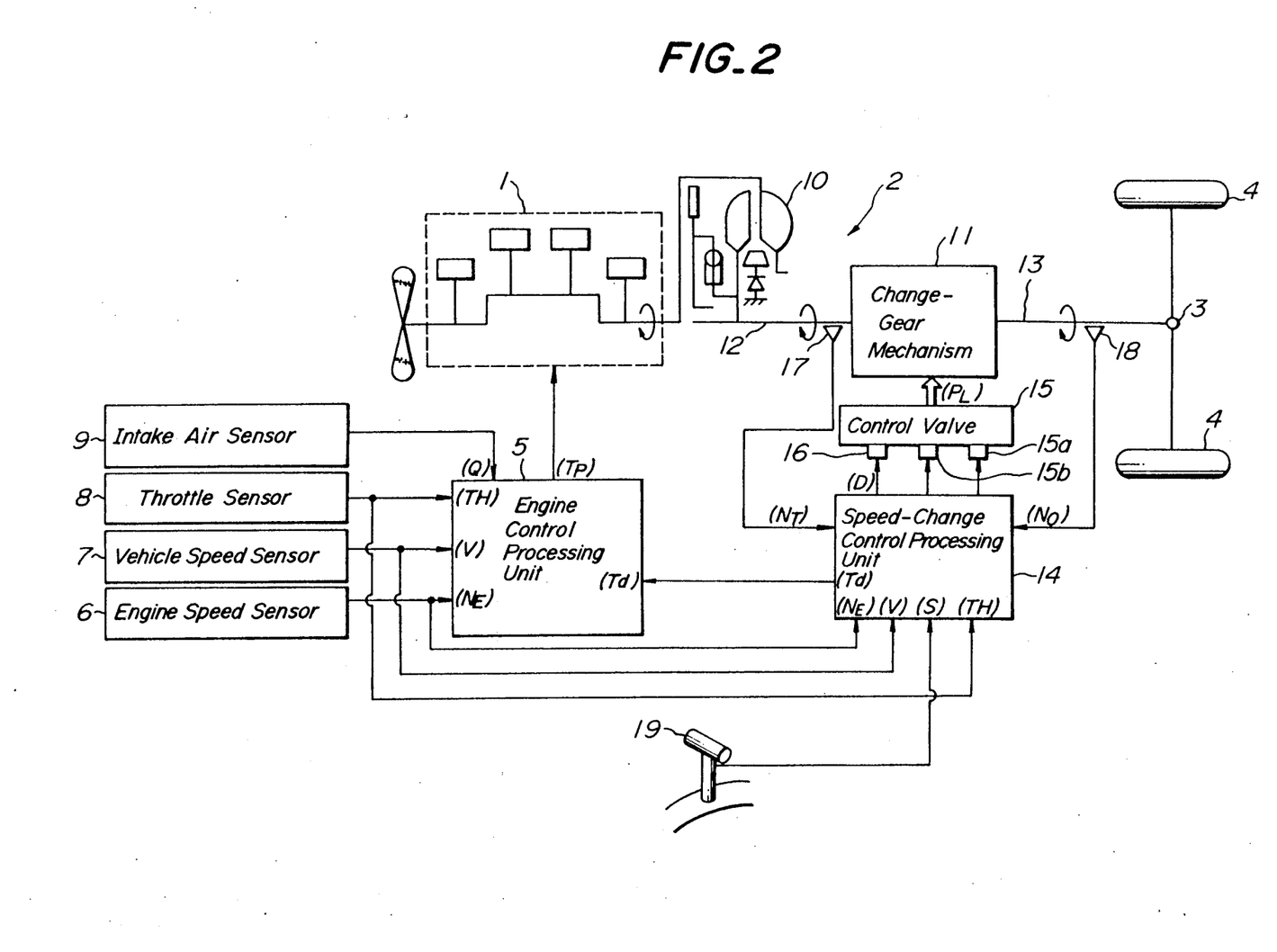
FIG. 2 is a block diagram showing one example of power train control system for an automotive vehicle which is equipped with the control device according to the present invention.

FIG. 2 is a block diagram showing one example of power train control system for an automotive vehicle which is equipped with the control device according to the present invention. The vehicle includes an electronically controlled fuel-injection type engine 1, an automatic transmission 2, a differential gear assembly 3 and driving wheels 4.

The engine is associated with an engine control processing unit 5 in the form of a microcomputer which is supplied with a signal from an engine speed sensor 6 for detecting the engine speed $N_E$, a signal from a vehicle speed sensor 7 for detecting the vehicle speed V, a signal from a throttle sensor 8 for detecting the engine throttle opening $T_H$, and a signal from an intake air sensor 9 for detecting the engine intake air quantity Q. Based on these input information, the processing unit 5 determines a fuel injection pulse width $T_P$ and/or engine ignition timing, and then supplies necessary control signals to the engine 1. The engine 1 is supplied with fuel whose quantity depends on the fuel injection pulse width $T_P$, and combusts the supplied fuel synchronously with the engine rotation to properly operate the engine 1.

The automatic transmission 2 includes a torque converter 10 and a change-gear mechanism 11 in tandem, and the engine output power is supplied to an input shaft 12 of the transmission 2 via the torque converter 10. The input rotational speed of the shaft 12 is increased or decreased according to a selected shift position of the change-gear mechanism 11, and then transmitted to an output shaft 13. The output shaft 13 is connected to the driving wheels 4 via the differential gear assembly 3, and is thus adapted to drive the vehicle.

A change-gear mechanism 11 incorporates various frictional elements for determining a shift position of the transmission, i.e. a power transfer route from the input shaft 12 to the output shaft 13, such as brakes and clutches including the above-mentioned driving clutch. These frictional elements are actuated selectively and hydraulically with a line pressure $P_L$ so that, the change-gear mechanism 11 selects an intended shift position, and effects a change into another shift position along with a change of frictional elements to be actuated.

The above-mentioned speed-change is controlled by a speed-change control processing unit 14 in the form of another microcomputer, and a control valve 15. The processing unit 14 selectively turns ON speed-change control shift solenoids 15a, 15b in the control valve 15, and supplies the line pressure $P_L$ selectively to the above-mentioned frictional elements such that a shift position can be selected according to the combination of ON's and OFF's of the shift solenoids 15a, 15b. Furthermore, the speed-change control processing unit 14 serves to control the duty of a line pressure control duty solenoid 16 in the control valve 15 according to a driving duty D. In this connection, it should be noted that the line pressure $P_L$ rises with an increase in the duty D. On this occasion, the processing unit 14 also serves to control reduction in a clutch transfer torque capacity by reducing the line pressure $P_L$ and hence a clutch pressure $P_{CL}$ upon starting the vehicle.

For effecting the above-mentioned speed-change control, line pressure control and clutch transfer torque capacity reduction control, the speed-change control processing unit 14 is supplied, like the engine control processing unit 5, with the signals from the engine speed sensor 6, the vehicle speed sensor 7 and the throttle sensor 8, respectively. The speed-change control processing unit 14 is further supplied with a signal from an input speed sensor 17 for detecting the rotational speed $N_T$ of the input shaft 12, a signal from an output speed sensor 18 for detecting the rotational speed $N_O$ of the output shaft 13, and a signal S representing a selected range of the transmission or the position of a select lever 19.

Figure 3:
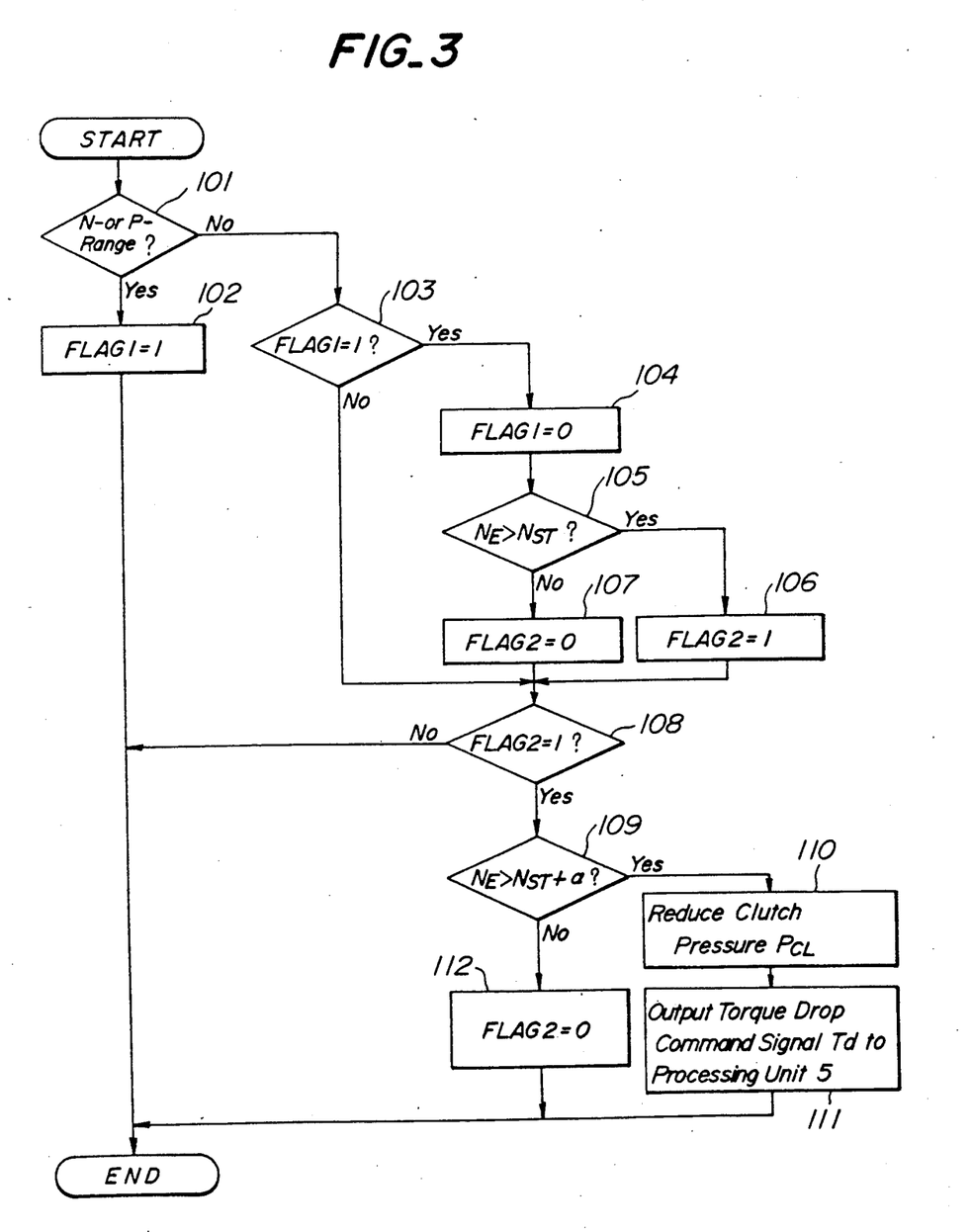
FIG. 3 is a flow chart showing one example of control program of a speed-change control unit for the control device of FIG. 2.

The speed-change control processing unit 14 serves to execute a known control program (not illustrated) for the speed-change control and the line pressure control, and also to execute a control program shown in FIG. 3 for controlling reduction in the clutch transfer torque capacity. Besides, the speed-change control processing unit 14 provides the engine control processing unit 5 with a torque drop command signal $T_d$ which is used for the engine output reduction control by the engine control processing unit 5.

Next, a control program to be executed in carrying out the reduction control according to the present invention will be explained with reference to FIG. 3. First of all, the program includes a step 101 which is for determining whether N- or P-range is being selected, based on the signal S representing a selected range (N-, P-, D-, II-, I- or R-range) of the transmission or corresponding position of the select lever 19. In the stationary state of the vehicle wherein the driver does not intend to start the vehicle, N- or P-range has been selected so that the control is passed from Yes of the step 101 to a step 102 where a flag FLAG1 is set, i.e. FLAG1=1. In this way, when the driver intends to start the vehicle and selects a running range (D-, II-, I- or R-range) in a stationary state with FLAG1=1, the control is passed from No of the step 101 to a step 103 where determination is made as to whether FLAG1 is 1. At this time, FLAG1=1 means that a starting operation (for example, N-to-D select operation) has now been carried out. Thus, FLAG1 is reset (FLAG1=0) at a step 104, and the control is then passed to a step 105 where determination is made as to whether the engine speed $N_E$ detected by the engine speed sensor 6 exceeds a predetermined engine stalling speed $N_{ST}$ which is previously stored in a memory, not shown, as being related to the engine output.

The engine stalling speed $N_{ST}$ is a constant which can be uniquely determined based on the characteristics of the engine and the torque converter ("Theories and Practice of Automatic Transmissions", pages 338 to 339, written by Ichiro Sakurai and published by Railway Japan Co., Ltd., 1979, and "Automobile Engineering Handbook", 5th edition, pages 1-16 to 1-17, published by the Association of Automobile Technologies, 1982). If the engine speed $N_E$ does not reach the stalling speed $N_{ST}$ because of insufficient depression of an accelerator pedal or insufficient engine throttle opening, the engine will stall. The engine speed $N_E$ exceeds the stalling speed $N_{ST}$ ($N_E>N_{ST}$) when a racing selection is made by deeply stepping on the accelerator pedal in advance of a starting operation, until completion of engagement of the driving clutch. In such a case, the control is passed from Yes of the step 105 to a step 106 where a flag FLAG2 is set (FLAG2=1). At a normal starting operation, the engine speed $N_E$ is equal to or smaller than the engine stalling speed $N_{ST}$ ($N_E \leq N_{ST}$) so that the control is passed from No of the step 105 to a step 107 where the flag FLAG2 is reset (FLAG2=0).

Figure 4:
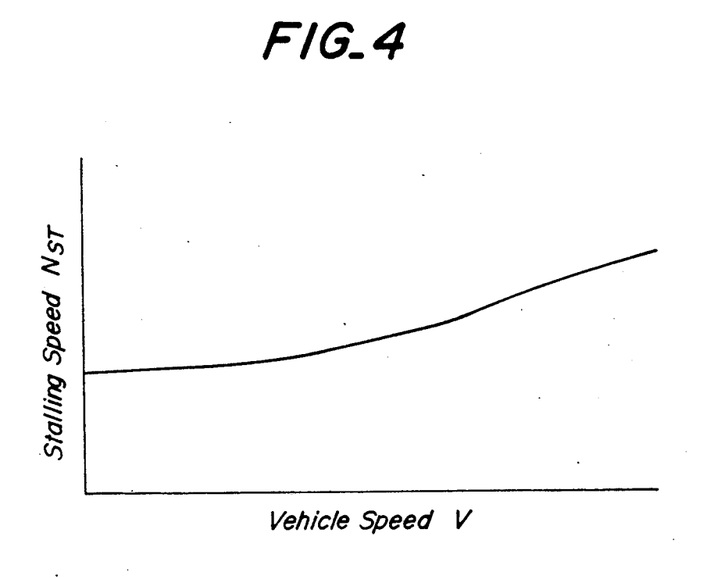
FIG. 4 is a diagram showing the relationship between the vehicle speed and the engine stalling speed.

When N-range of the automatic transmission is selected, the vehicle is usually in a stationary state. However, even when N-range is selected and the engine output is zero, if a vehicle is running down a slope, the vehicle continues to run without the engine output. Thus, for a racing selection on the slope, or when a running range is selected during the running in a racing state, the reduction control according to the present invention may be carried out based on the engine stalling speed which varies with increase in the vehicle speed. To this end, a plurality of vehicle-speed-vs.-stalling-speed maps shown in FIG. 4 may be stored for respective engine outputs which can be calculated based on the throttle opening, the number of cylinders for which fuel supply is stopped, and ignition timing. A vehicle-speed-vs.-stalling-speed map corresponding to the calculated engine output is used to retrieve a stalling speed $N_{ST}$ map according to a given vehicle speed V, and the obtained map value is determined as the stalling speed $N_{ST}$. In this way, it is possible to determine an appropriate stalling speed $N_{ST}$ for a racing selection on a downward slope.

Referring once again to FIG. 3, the control is now passed to a step 108 via the steps 106, 107 and No of the step 103, where determination is made as to whether FLAG2 is 1. If the determination is No, the vehicle is assumed to be in a normal starting state so that the control is terminated. If the determination is Yes, the control is passed to a step 109 to determine whether the engine speed $N_E$ exceeds the sum of the stalling speed $N_{ST}$ and $\alpha$ ($\alpha$ denotes a given constant determined based on fluctuation of the torque converter, etc.). If the determination at the step 109 is Yes, or $N_E>N_{ST}+\alpha$, the driving clutch, which has to be engaged in order to start the vehicle, has not yet completed the engagement: thus, the clutch pressure $P_{CL}$ is reduced at a step 110 by reducing the driving duty D of the duty solenoid 16. At a next step 111, a torque drop command signal $T_d$ is supplied to the engine control processing unit 5. If the determination at the step 109 is No, or $N_E \leq N_{ST}+\alpha$, it is assumed that the driving clutch has completed the engagement, so that the flag FLAG2 is reset at a step 112 (FLAG2=0).

Figure 5:
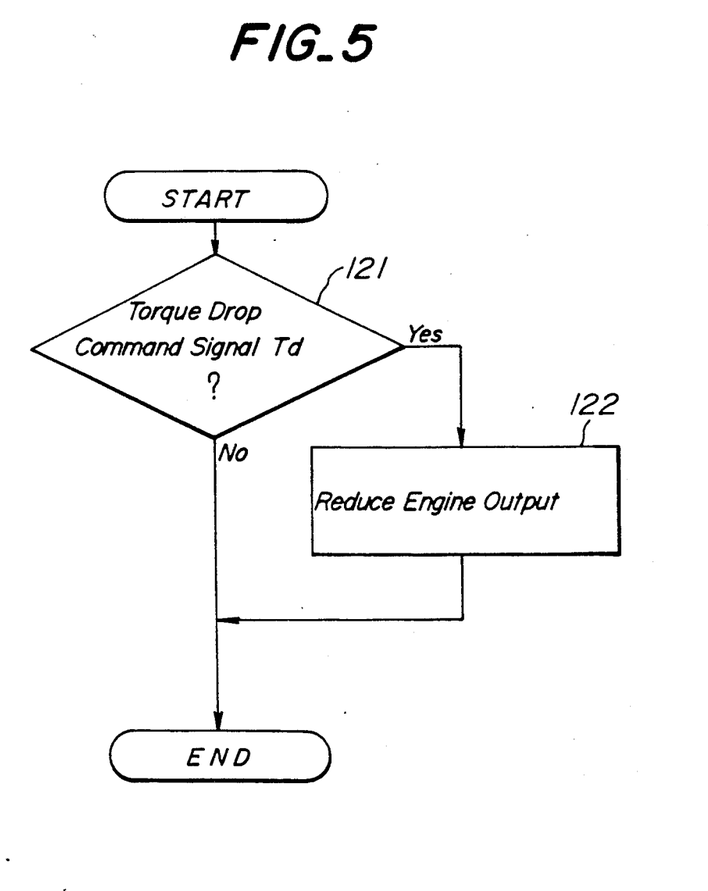
FIG. 5 is a flow chart showing one example of control program of an engine control unit for the control device of FIG. 2.

The output reduction control for an engine 1 is carried out using a control program, of which one example is shown in FIG. 5. At a step 121, determination is made as to whether a torque drop command signal $T_d$ from the speed-change control processing unit 14 is found. If the determination is Yes, with the torque drop command signal $T_d$ found, the engine output is reduced at a step 122 by reducing the fuel injection pulse width $T_P$ to lower the engine speed $N_E$. If the determination at the step 121 is No, the control is terminated.

The functions of the above-mentioned reduction control is explained below. First, upon starting the vehicle, the control passes through the steps 101, 102, 101, 103, 104 and 105 in FIG. 3. In a normal starting operation of the vehicle, the engine speed $N_E$ is initially equal to or smaller than the stalling speed $N_{ST}$ so that the control passes from No of the step 105, through the step 107, to No of the step 108. Then, the engine and the driving clutch are released from the reduction control of the present invention. If it is determined at the step 105 that a racing selection is being made, the engine speed is already high at the stating operation so that the control passes from Yes of the step 105, through the step 106 and yes of the step 108, to the step 109. In the duration when the determination of the step 109 is Yes ($N_E > N_{ST} + \alpha$), or while the driving clutch has not completed engagement, it is required to control reduction in its transfer torque capacity. Therefore, the clutch pressure $P_{CL}$ is reduced at the step 110, allowing a higher impact energy to be absorbed by the driving clutch, thereby causing the peak value of the output torque of the transmission to drop and reducing the racing select shock. At the same time, a torque drop command signal $T_d$ is transmitted from the step 111, so that the steps 121 to 122 in FIG. 5 are executed to carry out the engine output reduction control. Thus, the combined reduction control of the clutch transfer torque capacity and the engine output serves to minimize a racing select shock as intended.

On the other hand, if the determination at the step 109 is No ($N_E \leq N_{ST} + \alpha$), the driving clutch has completed its engagement so that the flag FLAG2 is reset at the step 112. Then, the control passes through No's of the steps 101, 103 and 108 without executing the step 122 for engine output reduction control in FIG. 5, and the reduction control having achieved the initial purpose can be stopped. Thus, the clutch pressure $P_{CL}$ and the engine speed $N_E$ are increased quickly, allowing the vehicle to be started normally. Unlike the prior art, there is no difficulty in smoothly starting the vehicle. Moreover, by stopping the reduction control of the clutch pressure $P_{CL}$ immediately after completion of engagement of the driving clutch, it is possible to positively prevent the problem of clutch burn-out.

In the above-mentioned embodiment, the vehicle is supposed to employ both the clutch transfer torque capacity reduction control and engine output reduction control. For vehicles employing either one of the reduction control functions only, it is of course that the step 110 in FIG. 3 or the entire control program in FIG. 5 would not be required.

Figure 6:
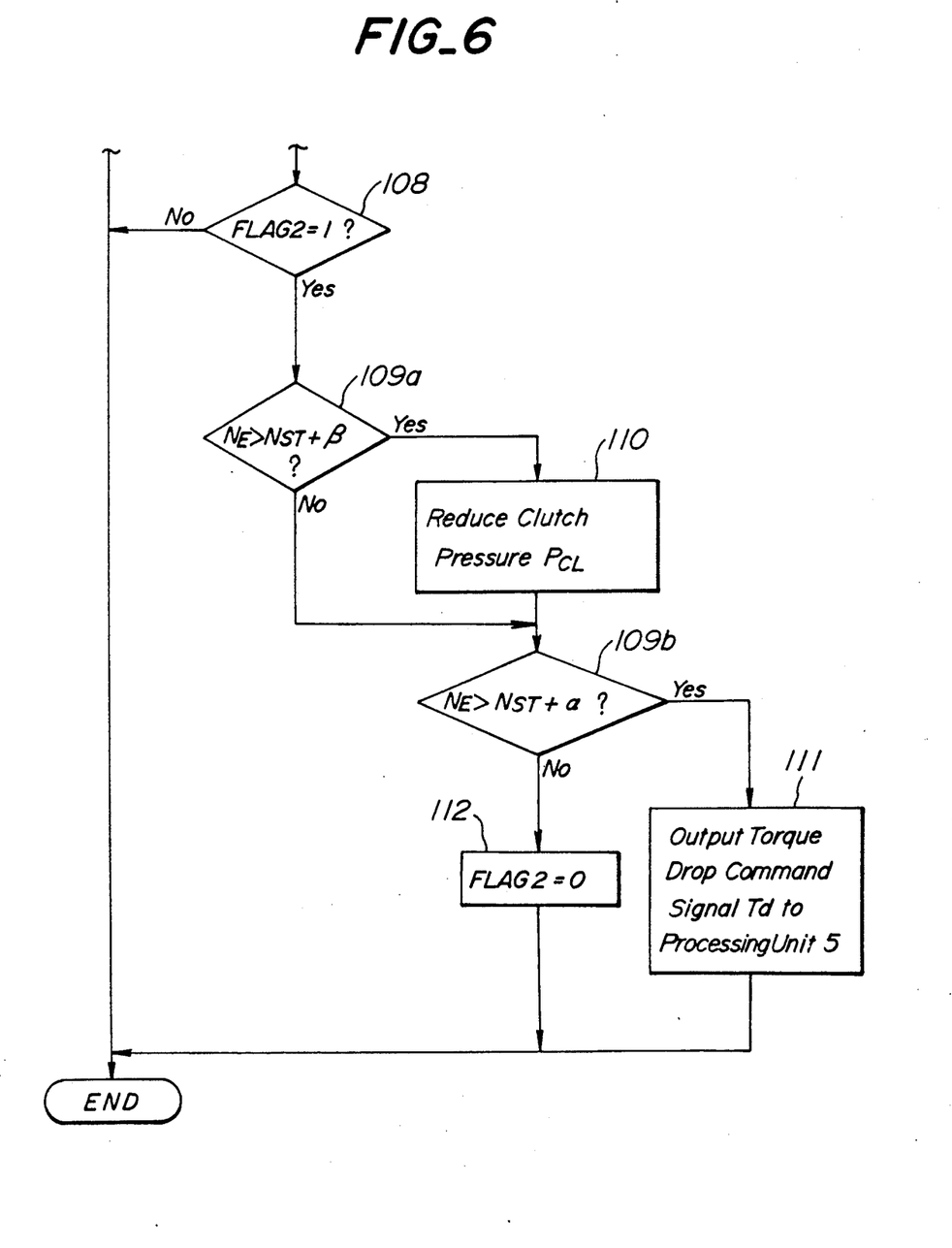
FIG. 6 is a flow chart showing a modified example of the control program of a speed-change control unit for the control device of FIG. 2

As shown in FIG. 6, the determination condition for the step 109 in FIG. 3 may be changed from $N_E > N_{ST} + \alpha$ to $N_E > N_{ST} + \beta$ assuming that $\beta$ is a constant larger than $\alpha$ (step 109a). Thereby, the timing for stopping the reduction control of the clutch transfer torque capacity can be set in consideration of the response characteristic of the hydraulic system. Another step 109b for determining whether $N_E$ exceeds $N_{ST} + \alpha$ may be inserted between the steps 110 and 111, so that the timing for stopping the engine output reduction control can be set separately.

Figure 7:
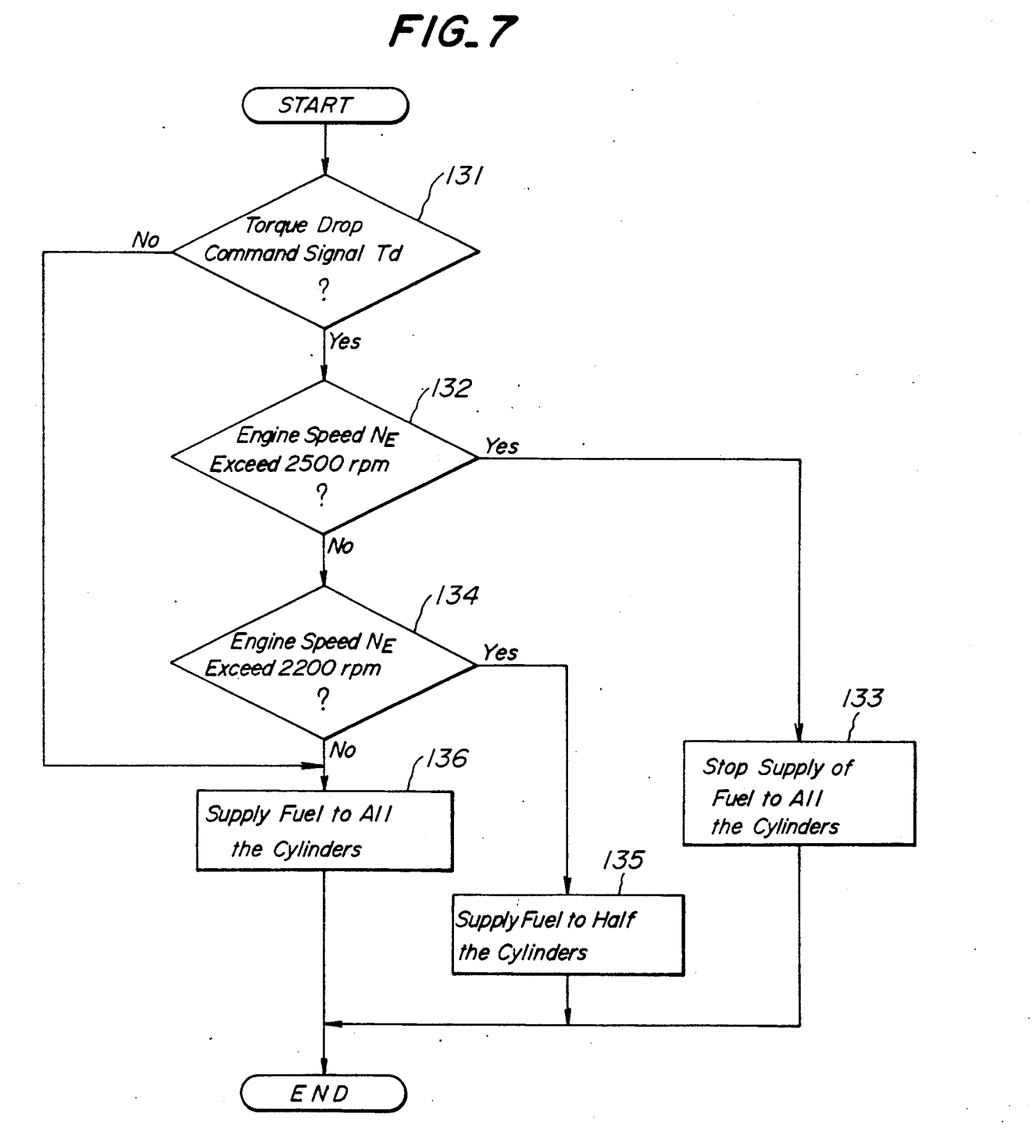
FIG. 7 is a flow chart showing another example of control program of an engine control unit for the control device of FIG. 2.

The output reduction control of the engine 1 can be carried out by using another control program shown in FIG. 7. At a step 131, determination is made as to whether a torque drop command signal $T_d$ from the speed-change control processing unit 14 is found. If the determination is Yes, with the torque drop command signal $T_d$ found, determination is then made at a step 132 as to whether the engine speed $N_E$ exceeds 2500 rpm. If the determination is Yes ($N_E > 2500$ rpm), fuel supply to all the cylinders (e.g. six cylinders) of the engine 1 is stopped to immediately reduce the engine output. If the determination is No ($_E \leq 2500$ rpm), determination is made at a step 134 as to whether the engine speed $N_E$ exceeds 2200 rpm. If the determination is Yes ($N_E > 2200$ rpm), fuel supply to half the cylinders of the engine 1 (e.g. three cylinders) is stopped to reduce the engine output. For the determination of No at the step 134 ($N_E \leq 2200$ rpm), fuel is supplied to all the cylinders at a step 136. When the determination at the step 131 becomes No, i.e. at a normal starting operation, the control is passed from No of the step 131 to the step 136 so that fuel is supplied to all the cylinders as usual, without reducing the engine output.

The functions of the above-mentioned engine output reduction control are explained below. Upon starting the vehicle, when the determination at the step 109 (FIG. 3) becomes Yes ($N_E > N_{ST} + \alpha$), a torque drop command signal $T_d$ is supplied to the engine control processing unit 5 at the step 131. In response to the signal $T_d$, when the engine speed $N_E$ exceeds 2500 rpm, the processing unit 5 executes the steps 131, 132 and 133 in FIG. 7, thereby stopping fuel supply to all the cylinders of the engine 1 to cause the engine speed $N_E$ to drop immediately. When the engine speed $N_E$ does not exceed 2500 rpm but does exceed 2200 rpm, the processing unit 5 executes the steps 131, 132, 134 and 135 to stop the fuel supply to half the cylinders of the engine 1, causing the engine speed $N_E$ to slow down. When the engine speed $N_E$ does not exceed 2200 rpm, the processing unit 5 executes the steps 131, 132, 134 and 136 to supply fuel to all the cylinders of the engine 1, causing the engine speed $N_E$ to rise immediately. Thus, even when the vehicle starting operation is made under a high engine speed, the engine output reduction control is performed until the driving clutch completes engagement, such that the actual engine speed $N_E$ detected by the engine speed sensor 6 is maintained in a certain range around the engine stalling speed $N_{ST}$ (for example, in a range from 2200 rpm to 2500 rpm under the set conditions shown in FIG. 7, i.e. around 2300 rpm). Owing to the above-mentioned engine output reduction control, unlike the prior art, the engine speed $N_E$ is not excessively reduced below the stalling speed $N_{ST}$ in a cold state of the transmission, so that it is possible to effectively prevent the engine from stalling. At the same time, the peak value of the transmission output torque can be lowered to alleviate the racing select shock as intended.

When the determination at the step 109 in FIG. 3 is No ($N_E \leq N_{ST} + \alpha$), the clutch has completed its engagement so that the flag FLAG2 is reset at the step 112. The control then passes through the steps 101 and 103, and No of the step 108. Thus, the steps 133 and 135 for the engine output reduction control in FIG. 7 are not executed. The engine output reduction control which has achieved the intended purpose is stopped, thereby increasing the engine speed $N_E$ and allowing the vehicle to be started normally.

In the embodiment of FIG. 7, the engine output reduction control is performed by controlling the number of cylinders to be supplied with fuel or changing the number of cylinders to 0, 3 or 6 in the case of a six cylinder engine. However, the engine output reduction control is not limited to this method; for example, the number of cylinders to be supplied with fuel may be changed to 0, 1, 2, 3, 4, 5 to 6, thereby to ensure a higher controllability. Alternatively, the intake air quantity Q may be controlled to be variable.

In the above-mentioned embodiments, the engine output reduction control is stopped based on the completion of actual engagement of the driving clutch. Another proposal is to predict the timing of the driving clutch engagement by means of a timer control that stops the reduction control at a predetermined point in time after a running range has been selected, the time length being a function of ATF temperature, for example.

Figure 8:
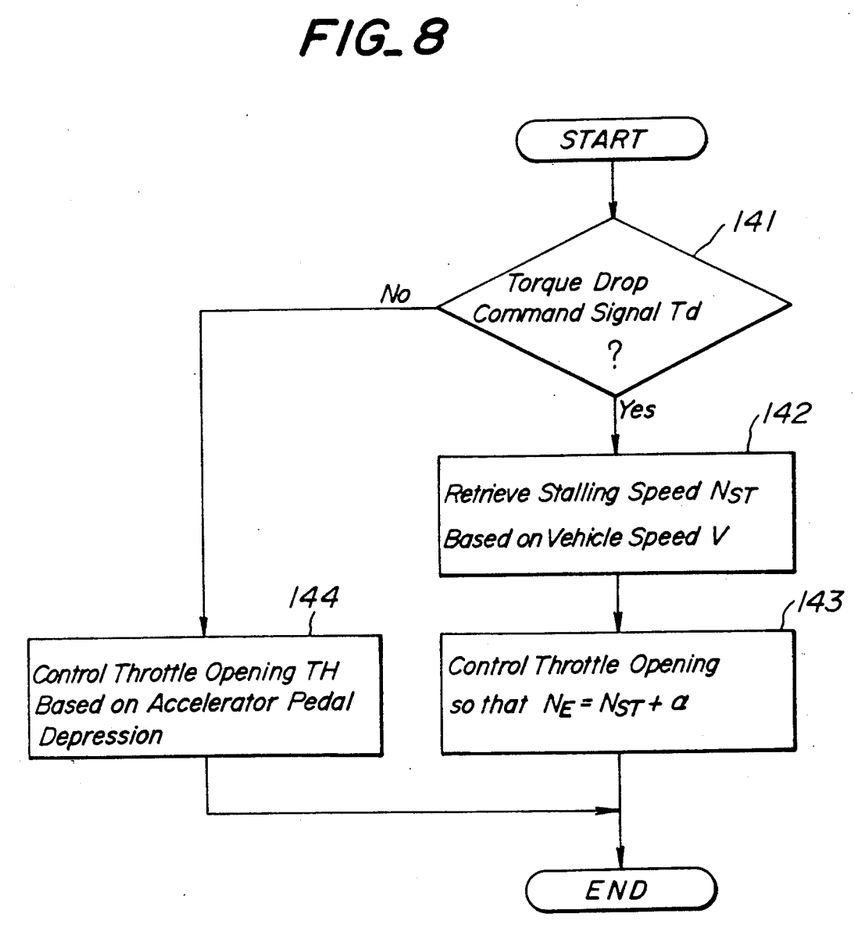
FIG. 8 is a flow chart showing still another example of control program of an engine control unit for the control device of FIG. 2.

There is shown in FIG. 8 a flow chart of still another example of the control program for the engine output reduction control. The control device using this control program incorporates an electronic control throttle valve (not illustrated) in the engine 1 shown in FIG. 2. The throttle valve includes an electronic carburetor, and operates mechanically during a normal operation and exerts more precise electronic control over an engine speed $N_E$ during idling. The engine control processing unit 5 executes the control program of FIG. 8 to achieve a feedback control of the throttle opening $T_H$.

More particularly, at a step 141 in the control program of FIG. 8, a determination is made as to whether a torque drop command signal $T_d$ from the speed-change control processing unit 14 is found. If the determination is Yes, with the torque drop command signal $T_d$ found, the control is passed to a step 142 where the engine stalling speed $N_{ST}$ is retrieved from the vehicle-speed-vs.-stalling-speed map shown in FIG. 4 based on the vehicle speed V as detected by the vehicle speed sensor 7. At a next step 143, the stalling speed $N_{ST}$ is used to carry out a feedback control of the throttle opening $T_H$ such that the engine speed $N_E$ coincides with the sum of the stalling speed $N_{ST}$ and a given constant $\alpha$ (for example, 200 rpm) corresponding to various fluctuations ($N_E = N_{ST} + \alpha$). If the determination at the previous step 141 is No, with no torque drop command signal $T_d$ found, it is assumed that a normal starting operation is being performed or the driving clutch has completed engagement. In this case, the engine output reduction control is not required, so that the throttle opening $T_H$ is controlled at a step 144 based on the accelerator pedal depression as usual. By this embodiment, the controllability in maintaining the engine speed $N_E$ substantially constant in a duration from the racing selection to the completion of engagement of the driving clutch can be further improved.

It will be readily appreciated from the foregoing description that, when the driver of an automotive vehicle performs a racing selection, the engine/automatic unified control device according t the present invention makes it possible to effectively carry out a reduction control of at least one parameter which represents the output power to be transmitted from the engine to the driving wheels through the transmission, to lower the energy to be absorbed by the driving clutch in the transmission thereby alleviating the racing select shock. The control device according to the present invention further determines the timing for stopping the reduction control by detecting the completion of engagement of the driving clutch. Thus, immediately after the reduction control has achieved an intended racing select shock alleviation, the vehicle can be started normally without being accompanied by engine stalling.

While the present invention has been described with reference to certain specific embodiments, it is of course that various alterations and/or modifications may be made without departing from the scope of the invention.

What is claimed is:

1. An engine/automatic transmission unified control device for an automotive vehicle including an engine and driving wheels driven by said engine through an automatic transmission with a driving clutch which is maintained disengaged in a neutral or parking range of the transmission and operated into engagement upon selection of a running range of the transmission, said control device comprising:

reduction control means operative during a changeover of said transmission into the running range from a racing state in which an accelerator pedal is stepped on with the neutral or parking range of the transmission selected, said reduction control means being adapted to carry out a reduction control of at least one parameter representing an output power to be transmitted from the engine to the driving wheels of the vehicle via said transmission;

detecting means associated with said driving clutch for detecting completion of engagement thereof upon completion of the changeover of the transmission into the running range; and reduction control stopping means associated with the reduction control means and the detecting means, for stopping the reduction control of the parameter in question as soon as the detecting means detects completion of engagement of the driving clutch.

2. The control device as set forth in claim 1, wherein said parameter includes an engine speed, said reduction control means being associated with said engine to control said engine speed according to a predetermined engine stalling speed and in a duration from said racing state until completion of engagement of said driving clutch upon changeover of the transmission into the running range.

3. The control device as set forth in claim 1, wherein said detecting means is adapted to detect completion of engagement of said driving clutch by detecting decrease in the actual engine speed below a predetermined value which depends upon the engine stalling speed.

4. The control device as set forth in claim 2 or 3, wherein said engine stalling speed is determined in accordance with speed of said vehicle.

5. The control device as set forth in claim 2 or 3, wherein said engine stalling speed is determined in accordance with output characteristics of said engine and the torque converter of said transmission.

6. The control device as set forth in claim 1, wherein said parameter includes an engine output, said reduction control means being associated with said engine.

7. The control device as set forth in claim 1, wherein said parameter includes a transfer torque capacity of said driving clutch, said reduction control means being adapted to control working pressure of said driving clutch.

8. The control device as set forth in claim 1, wherein said parameter includes an engine output and a transfer torque capacity of said driving clutch, said reduction control means being associated with said engine and adapted to control working pressure of said driving clutch.

* * * * *

UNITED STATES PATENT AND TRADEMARK OFFICE
CERTIFICATE OF CORRECTION

PATENT NO. : 5,050,454

DATED : September 24, 1991

INVENTOR(S) : Hiroshi YAMAGUCHI, et al.

It is certified that error appears in the above-identified patent and that said Letters Patent is hereby corrected as shown below:

Title page, reference number [75] under Inventors, after "Shinsuke Nakazawa, Yokohama," insert -- Hiroshi SASAKI, Yokohama; Kazuhiro ISHIGAMI, Sagamihara; Shinichi TAKENOUCHI, Yokosuka,--.

Signed and Sealed this

Seventh Day of January, 1992

Attest:

HARRY F. MANBECK, JR.

*Attesting Officer*  *Commissioner of Patents and Trademarks*